Patented Jan. 5, 1932

1,839,848

UNITED STATES PATENT OFFICE

CLIFF S. HAMILTON, OF EVANSTON, ILLINOIS, ASSIGNOR TO PARKE, DAVIS & COMPANY, OF DETROIT, MICHIGAN, A CORPORATION OF MICHIGAN

BETA AMINOAMIDE DERIVATIVE OF ARSONIC ACID

No Drawing.      Application filed March 19, 1928. Serial No. 263,002.

The invention relates to certain new organic arsenic compounds which are particularly useful because of certain biological properties rendering them of great therapeutic value. The new compounds may be described as aromatic arsonic acid derivatives having in the molecule a beta-aminoamide side chain with the beta-amino group joined to the aromatic nucleus. The new compounds are represented by the following general structural formula:

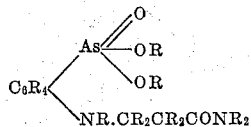

where R is hydrogen or any substituent.

It has been found that when the amino group is in the beta position in the side chain, the compound is of greater effectiveness in the treatment of neurosyphilis and trypanosomasis than the corresponding alpha compounds. The new compounds are also of greater value because of their low toxicity and high therapeutic ratio.

The acid substances are readily converted into the corresponding alkaline salts which are particularly valuable because they are soluble in water, while the acids themselves are not soluble in water.

The general method for the preparation of the new compounds is to dissolve a substituted phenyl arsonic acid in alkali and add thereto the proper proportion of a beta-halogen derivative of the amide compound, the two compounds being united by the liberation of a halogen acid. The following examples will demonstrate the more specific methods which may be employed in obtaining the substances:

*Example 1.—N (phenyl-4-sodium arsonate) beta-amino-propionamid;*

(NaO)(HO)(O)AsC$_6$H$_4$NHCH$_2$CH$_2$CONH$_2$.H$_2$O

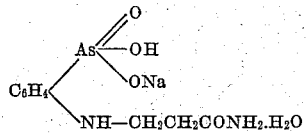

217 grams (1 mole) of p-amino phenyl arsonic acid are dissolved in 0.5 liter of 2 N sodium hydroxide or other equivalent base. To this is added 152 grams of beta-bromopropionamid (or the equivalent amount of the beta-chlor or iodo derivative) and the mixture is refluxed for 4–5 hours. On cooling the reaction product separates. It is filtered off and purified by dissolving in just enough concentrated alkali then precipitating by adding concentrated hydrochloric acid somewhat in excess over the amount of alkali used. This is repeated until a test shows the product to be free from any unreacted amino phenyl arsonic acid. The test depends upon the formation of a red color when an alkaline solution of "R" salt is added to a diazotized solution of the amino phenyl arsonic acid.

The conversion to the mono sodium salt and its isolation is accomplished as follows: The acid obtained above is dissolved in the calculated amount of 2 N sodium hydroxide and poured with stirring, into several volumes of absolute alcohol or other suitable solvent. Or the solution may, instead, be evaporated to dryness. The precipitated air-dried salt contains 2 moles of water of hydration.

Analysis: As. calculated for a dihydrate=21.67%
found (average of several) =21.44%

The compound is a colorless crystalline salt, readily soluble in water, and is either neutral or faintly alkaline to phenolphthalein.

The potassium or equivalent salt may be made by an analogous method.

*Example 2.—Mono sodium salt of N (phenyl-2-methyl-5 arsonic acid) beta-amino-propionamide.*

5 grams of the substituted phenyl arsonic acid, 3-amino-4-methyl phenyl arsonic acid, is dissolved in about 22 cc. N sodium hydroxide or other equivalent base. To this is added 5 g. of beta-iodopropionamid (or the equivalent amount of beta-chloro or beta-bromopropionamid) and the mixture is refluxed for about 5 hours. The solution is treated with decolorizing carbon, filtered, and made distinctly acid to Congo red. On cooling, crystallization takes place. The crude material is dissolved in the necessary amount of 2 N sodium hydroxide and reprecipitated by adding concentrated hydrochloric acid in slight excess. This purification is repeated till the compound is freed from any unreacted arsonic acid.

The new acid product has the following structural formula

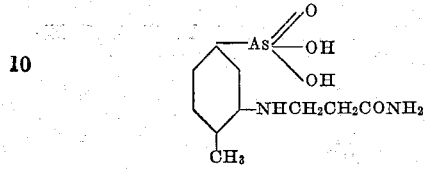

Analysis: As. calculated = 24.83%
found (average) = 24.68%

The mono sodium salt may be prepared in the same manner as indicated in Example 1.

The foregoing examples illustrate some of the substances falling within the purview of my invention. The invention however is not limited to these particular compounds as other analogous substances may be prepared in substantially the same manner and will also be represented by the general structural formula hereinbefore set forth.

What I claim as my invention is:

1. A new composition of matter comprising an aromatic arsonic acid compound having in its molecule a normal beta-aminoamide side chain, the beta-amino group being joined to the aromatic nucleus.

2. A water soluble compound represented by the following formula

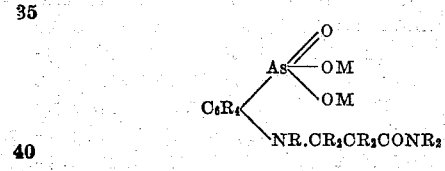

where R is H or an alkyl and M is H or a metal.

3. A water soluble compound represented by the following formula

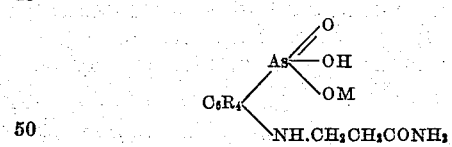

where R is H or an alkyl and M is a metal.

4. A water soluble compound represented by the following formula

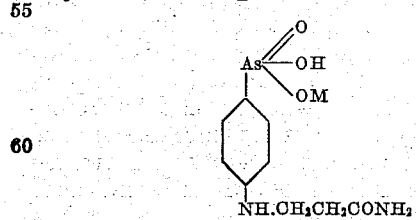

where M is a metal.

5. A new compound comprising an aromatic arsonic acid compound having in its molecule a beta-amino-propionamid side chain, the beta-amino group being joined to the aromatic nucleus.

6. A new compound comprising an aromatic arsonic acid compound having in its molecule a normal beta-amino-propionamid side chain, the beta-amino group being joined to the aromatic nucleus.

7. A new water soluble compound comprising an aromatic arsonic acid having in its molecule a normal beta-amino-propionamid side chain, the beta-amino group being joined to the aromatic nucleus, said composition being represented by the following formula

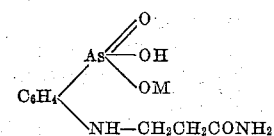

8. A water soluble compound represented by the following formula

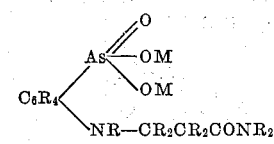

where R is H or an alkyl, M is H or a metal and the radical

is normal beta-aminopropionamid.

9. A compound represented by the following formula

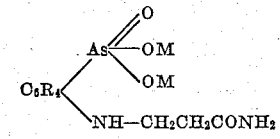

where R is hydrogen or an alkyl group and M is hydrogen or an alkali metal.

10. A compound represented by the following formula

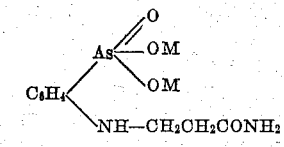

where M is hydrogen or an alkali metal.

11. A compound represented by the following formula

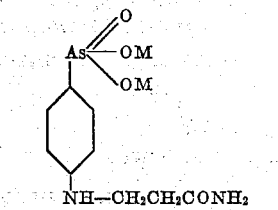

where M is hydrogen or an alkali metal.

12. A water soluble compound represented by the following formula:
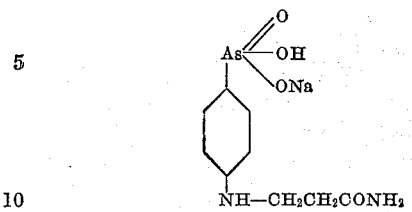
13. A compound represented by the following formula
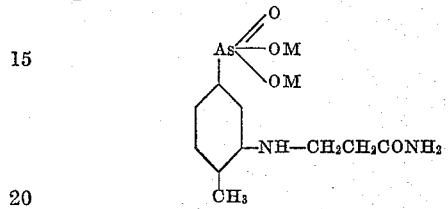
where M is hydrogen or an alkali metal.
14. A water soluble compound represented by the following formula:
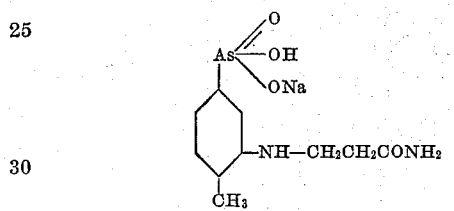
In testimony whereof I affix my signature.
CLIFF S. HAMILTON.